(12) United States Patent
Biber (10) Patent No.: US 12,540,990 B2
(45) Date of Patent: Feb. 3, 2026

(54) METHOD FOR INVALIDATING A LOCAL COIL FOR AN MRT SYSTEM

(71) Applicant: Siemens Healthineers AG, Forchheim (DE)

(72) Inventor: Stephan Biber, Erlangen (DE)

(73) Assignee: Siemens Healthineers AG, Forchheim (DE)

( * ) Notice: Subject to any disclaimer, the term of this patent is extended or adjusted under 35 U.S.C. 154(b) by 166 days.

(21) Appl. No.: 18/381,666

(22) Filed: Oct. 19, 2023

(65) Prior Publication Data

US 2024/0133984 A1 Apr. 25, 2024
US 2024/0230802 A9 Jul. 11, 2024

(30) Foreign Application Priority Data

Oct. 21, 2022 (EP) .................................... 22202927

(51) Int. Cl.
*G01R 33/34* (2006.01)
*G01R 33/341* (2006.01)

(52) U.S. Cl.
CPC ..... *G01R 33/341* (2013.01); *G01R 33/34007* (2013.01); *G01R 33/34084* (2013.01)

(58) Field of Classification Search
CPC ............ G01R 33/341; G01R 33/34007; G01R 33/34084; G01R 33/288; G01R 33/5608; G01R 33/56308; G01R 33/36; G01R 33/20; G01R 33/3415; A61B 5/055
See application file for complete search history.

(56) References Cited

U.S. PATENT DOCUMENTS

| 7,230,425 | B2 | 6/2007 | Leussler | |
| 2014/0120523 | A1* | 5/2014 | Lowery, Jr. | .......... C12Q 1/6816 435/7.1 |
| 2015/0112187 | A1* | 4/2015 | Petropoulos | ........... A61B 5/055 600/422 |
| 2024/0235064 | A9 | 7/2024 | Biber | |

FOREIGN PATENT DOCUMENTS

| EP | 2362235 A1 | 8/2011 |
| EP | 2862513 A2 | 4/2015 |
| EP | 4299002 A1 | 1/2024 |

* cited by examiner

*Primary Examiner* — G.M. A Hyder
(74) *Attorney, Agent, or Firm* — Banner & Witcoff, Ltd.

(57) ABSTRACT

The disclosure describes techniques for invalidating a local coil for a magnetic resonance tomography (MRT) system. The techniques include carrying out a measurement with the local coil on the MRT system, changing a mechanical and/or an electrical property of the local coil and/or an item of information about the local coil in the MRT system to the extent that a number of measurements possible with this local coil is reduced and, in the case where only the measurement carried out was possible with the local coil, a further measurement is no longer possible with this local coil on the MRT system. The disclosure also relates to a local coil and to an MRT system.

18 Claims, 2 Drawing Sheets

METHOD FOR INVALIDATING A LOCAL COIL FOR AN MRT SYSTEM

CROSS-REFERENCE TO RELATED APPLICATIONS

The present application claims priority to and the benefit of Europe patent application no. EP 22202927.4, filed on Oct. 21, 2022, the contents of which are incorporated herein by reference in their entirety.

TECHNICAL FIELD

The disclosure relates to techniques for invalidating a local coil for a Magnetic Resonance Tomography (MRT) system, and to a corresponding local coil and an MRT system. In particular, the disclosure relates to an arrangement and technique for disabling MRT local coils after a single use, and described the structure of a single-use local coil and methods for the purposeful destruction of local coils after their use.

BACKGROUND

Recordings are often made on current MRT systems using local coils. These local coils are located in, under, or above the region to be recorded and supply the measurement data from which the images are then reconstructed after the recording. The local coil can be formed from a single coil or an arrangement of a plurality of coils.

Special hygiene requirements apply for certain recordings, for example dental or in other orifices of the body. It is precisely when hygiene problems can occur that the use of disposable coils is very advantageous, since no special disinfection requirements have to be stipulated. That is, with disposable coils, there is a great deal of interest in ensuring that a single-use coil is no longer used after use, as this ensures that the coil cannot transfer any pathogens.

SUMMARY

It is therefore an object of the present disclosure to disclose techniques for invalidating a local coil for an MRT system, which overcomes the drawbacks of conventional systems and permits a simple assurance of basic hygiene requirements. A further object is the provision of a corresponding local coil or an MRT system.

This object is achieved by the various embodiments as described herein, including the claims.

In an embodiment, a method for invalidating a local coil for an MRT system comprises:
carrying out a measurement with the local coil on the MRT system;
optionally ascertaining completion of the measurement; and
purposefully changing a mechanical and/or an electrical property of the local coil and/or an item of information about the local coil in the MRT system to the extent that a number of measurements possible with this local coil is reduced and, in the case where only the measurement carried out was (still) possible with the local coil, a further measurement is no longer possible with this local coil, at least on the MRT system.

The procedure for carrying out the measurement is generally known. For this, the local coil is placed at a defined position on the patient or the object to be examined, and the patient or the object to be examined is arranged in an MRT scanner. Subsequently, the measurement is carried out.

At a previously defined instant, e.g. after completion of the measurement (but not necessarily), the local coil is then "invalidated". For this, a mechanical and/or an electrical property of the local coil is purposefully changed, for example its coil winding or a component part of the local coil is destroyed or at least its properties changed. This can occur mechanically, for example by way of an applied force, or electrically, for example by way of a current, which results in blowing a fuse or the coil conductor. An item of information about the local coil in the MRT system can also be changed, for example a counter, which indicates how many measurements are still possible with this coil and with the MRT system, which in this case comprises the scanner(s) and optionally also connected servers for the organization of the MRT system, which contain corresponding data for checking the local coil.

The change takes place to the extent that a number of measurements possible with this local coil is reduced, for example a counter may be decremented. With a disposable coil, this counter will only have the value "1", i.e. only the measurement carried out will be possible with the local coil. In this case, the reduction in the number of measurements means that no further measurement is possible with this local coil, at least on the relevant MRT system. This can be achieved, for example, with said destruction of the local coil. The change takes place after completion of the measurement or as early as after insertion of the local coil, wherein the measurement should still be carried out in the latter case. For example, after insertion of the local coil in its interface, the coil could already have been invalidated by decrementing a counter. It is not destroyed at this instant, however, since otherwise a measurement would no longer be possible. When the coil is re-inserted, however, the MRT system would recognize that the coil has already been invalidated.

An embodiment of a local coil for a measurement with an MRT system comprises a changing unit for purposefully changing a mechanical and/or an electrical property of the local coil to the extent that a number of possible measurements is reduced and, in the case wherein only the measurement carried out with the local coil was (still) possible, a further measurement is no longer possible with this local coil on the MRT system.

For this, the local coil may comprise a memory unit with a protected memory whose content can be changed by way of an element of the local coil or an interface, but not by a user. The local coil may be e.g. an RX coil or a TX coil or an RX/TX coil. An RX coil may be embodied to receive radio-frequency signals, e.g. magnetic resonance signals of a patient. A TX coil may be embodied to transmit or emit radio-frequency signals, e.g. signals for exciting tissue of a patient. An RX/TX coil can represent e.g. a coil which comprises an RX coil and a TX coil.

An embodiment of an MRT system comprises a changing unit for purposefully changing a mechanical and/or an electrical property of a local coil to the extent that a number of possible measurements is reduced and, in the case where only the measurement carried out was (still) possible with the local coil, a further measurement is no longer possible with this local coil on the MRT system.

The local coil or the MRT system may e.g. comprise a unit for ascertaining completion of the measurement with the local coil on the MRT system. For instance, the local coil or the MRT system may be optionally configured such that after ascertaining completion of a measurement, a purposeful changing of a mechanical and/or an electrical property of the local coil is automatically effected. In other words, the local coil or the MRT system, as the case may be, may optionally ascertain a completion of the measurement with the local coil prior to any adjustments being made, e.g. the changing of the mechanical and/or an electrical property of the local coil.

In an embodiment, after completion of a measurement, the local coil is brought into a state (by purposeful influencing of its electrical or mechanical structures) which does not permit a second measurement to be carried out with the coil. For this, the local coil may be e.g. brought into a state in which it was intentionally rendered unusable by a user or an MRT system, or into a state in which the system does not recognize it (any longer) or into a state in which the system does not recognize it as being valid (any longer).

The coil is connected to the MRT system, for example via an "interface" as an intermediate component (this is usually a plug on the patient couch). This interface may e.g. adopt additional mechanical or electrical functions for purposeful destruction of the used local coil. Various apparatuses and associated methods exist as to how the local coil can be appropriately "changed".

A change may e.g. take place when a measurement is complete. Example instants for defining the "completion of the measurement" are unplugging of the coil ("unplugging") from the system or interface, the end of the measurement, which can be recognized by the combination of particular typical sequences on the system. For example, patient movement in/measurement with certain duration/patient movement out, or can be defined by the system as an explicit end of measuring and is defined before the patient can be moved out of the bore. The "completion of the measurement" can also be defined as a particular period between recognition of the coil/start of the measurement and the expiry of the validity of the coil. In an embodiment, at least one of these "end points" of a measurement is used to thereby limit the life of the local coil.

Different measures exist for purposeful destruction of the local coil. Example hardware-based measures are severing of the prime conductor of the local coil. This may e.g. occur via the interface, but can also occur without it. Normally, the local coil is connected to the interface via a plug. The interface forms a mechanical and/or an electrical interface to the MRT system. The interface accordingly forms a mechanical intervention in the coil (can be regarded, for example, as said changing unit), which on detachment (for example by pulling or pushing a release button) of the interface results in the prime conductor of the local coil being severed. For this, the prime conductor may be e.g. designed to be self-supporting on a short section inside the coil, so the conductor and its thin supporting structure can be easily broken through, for example by a chisel-like structure (as the changing unit), which presses on the conductor when the coil is unlatched or removed and severs the conductor. The contacts on the coil itself can be caused to break off when the coil is separated from the interface. An internal short-circuiting of the prime conductor of the coil or of parts of the resonance circuit is another example. This can also be caused by a movement on unplugging. As an electrical measure, the local coil can be provided at the end of the measurement with a high current pulse via the interface, which pulse destroys a component part in the coil. This may e.g. be a fusible cutout. Such fusible cutouts are used in coils for the purpose of patient safety to disconnect the resonance circuit of the coil and prevent possible burns to the patient in the case of an excessively high RF current for a certain duration. This case occurs extremely rarely, however, and only in the case of operating errors or major faults in the system or the coil.

Apart from destruction, it is also possible to detune the local coil, to thereby change its natural frequency. This may e.g. occur by opening a fusible cutout or by forming a short-circuit. In an embodiment, a component part connected in parallel, e.g. an inductor and/or a capacitor, is activated or deactivated in this framework, and the antennas of the local coil are detuned thereby. A similar situation is also possible with a diode, which is rendered conductive by a high current/voltage pulse and results in a short-circuit of the coil.

Another example change is also a change which results in a prevention of coil identification by the MRT system. The local coil is consequently no longer recognized by the MRT system. If this identification runs from interface to local coil via an electrical interface, then, similar to as in the case of severing of the prime conductor, one of these conductors can be disconnected and an identification can thereby be prevented. When an EEPROM is used, the data line (or also the line for the transmission clock) can be disconnected in this regard. However, it is also possible that the coil code is disconnected by mechanical disconnection or connection of a contact inside the coil when the coil is unplugged. It is likewise possible that a memory chip (EEPROM) located in the local coil is switched to a different address by way of the disconnection or short-circuiting of a conductor. The local coil would thus be recognized by the system, but it would be possible to ensure that the coil can no longer be used for a measurement in this state. Alternatively, a mechanism can destroy electronic component parts of the local coil, for example inductors, capacitors, or semiconductors, when it is unplugged by way of breaking in two or shearing-off.

A destruction can also be achieved with the aid of electromagnetic fields instead of via grid-bound voltages/currents: a high radio-frequency pulse or gradient pulse can induce a high-power pulse (current and/or voltage) in the local coil, and thus result in defective component parts (fuses, semiconductors, diodes, memory chips, inductors, capacitors, or resistors). This high-power pulse may e.g. be generated just before or while the patient is being moved out of the bore at the end of the measurement.

Basically, the changes can comprise any suitable electrical properties of the local coil (resistance, etc.), which change a property of the local coil by way of an enduring change due to electrical and/or mechanical destruction of a component part in the coil, or by generating or starting a short-circuit, and this property is decisive of whether the system permits use of the changed local coil.

In other embodiments, software-based measures may be implemented, for example on the basis of an individual identification number of the local coil. Blocking use due to identification of the coil may be performed as part of this process. For this, the identification number of the coil is compared with a database after recognition of the local coil. If the local coil is still valid, it remains valid and usable for a particular period or until a particular event occurs (see above: "end of the measurement"). It is then subsequently deleted from the list of usable coils.

Other embodiments comprise the comparison of the use of the serial numbers with a central database. For this purpose, when the coil is being used, the system asks, e.g. via a server, whether the serial number of the local coil is (still) valid. The local coil subsequently remains valid for a particular time and is then deleted from the central database. The local coil can thereby no longer be used on a system which is linked to this central database in terms of information technology. Distribution of the central database locally among all scanners of the MRT system is also possible. Regular comparison should take place here, however. The advantage here is that the scanner used at the instant of the measurement does not necessarily have to be online.

Existing coils may e.g. be allocated to the serial numbers via an additional identification number (e.g. a "CodeID"), which is allocated to the local coil or a larger bundle of local coils. With the aid of this additional identification number, it is possible to authenticate oneself as the purchaser of the local coil or of the coil bundle and unlock the use of the local coils on a local scanner or in a hospital, or purchase the unlocking. The additional identification number (for example, a bundle identification number) can result in unlocking of the associated coil identification numbers. Alternatively, the additional identification number can represent a key, which generates or unlocks the associated coil serial numbers via a fixed algorithm in the system. Comparison with a central server may take place here too, however, to prevent use of the coils on other scanners by blocking the IDs. Each coil ID may only be available once, and it should be possible to use it only once.

Other embodiments comprise a change in the content of a memory on the local coil. For instance, after the end of a measurement or even as early as immediately after the first plugging-in of the local coil, the content of the memory of the coil is changed so the coil cannot be used again. For this, a counter can be decremented, for example, which defines the number of uses. The MRT system then checks this counter. In an embodiment, the identification number of the local coil can also be deleted, however, or overwritten with a different number. This may take place e.g. such that a user or an MRT system is thereby shown that the coil has already been used. Advantageously, protected memory chips may be used for this since, otherwise, misuse by way of simple writing-back of the original data is possible. Software-based methods are particularly advantageous when they are used together with protected writing or communication methods, and theoretically also allow the number of uses to be limited to more than a single use if reasonable applications exist for this. Again, a single use can be preferred for hygiene reasons.

Further, embodiments and developments of the disclosure can be found in the dependent claims and the following description, it being possible for the independent claims of one category of claims to also be developed analogously to the dependent claims and exemplary embodiments of a different category of claims and, for instance, individual features of different exemplary embodiments or variants can also be combined to form new exemplary embodiments or variants.

According to an embodiment of a method, the local coil is connected to the MRT system via an interface as an intermediate component. Such an interface is basically known. According to the disclosure, a particular interface may be used, which is configured to perform the purposeful change in the mechanical and/or electrical property of the local coil. Furthermore, the interface may be designed to ascertain completion of a measurement and to carry out the changes of the local coil only when completion of the measurement has been ascertained. This interface may e.g. adopt additional mechanical or electrical functions therefore for purposeful destruction of the used local coil.

According to an embodiment of a method, a mechanical and/or an electrical property of the local coil is purposefully changed only after establishing the measurement. This has the advantage that it is possible to ensure that the local coil was actually also used for measurement before it is potentially rendered unusable.

An indication for completion of the measurement may be determined in various ways. One such indication may include and/or be determined via unplugging of the local coil from the system or the interface, and this may be ascertained first. With a mechanical change, the force that has to be applied for unplugging may be used. For example, a connector of the local coil can be characterized such that it is broken off by this application of force, or this force can be used to sever the coil conductor. Alternatively, an end of the measurement can be ascertained. This may occur by ascertaining whether a combination of particular typical sequences has taken place on the MRT system, for example the patient moved into the bore, the measurement takes place, the patient is moved out of the bore again, or data of the MRT system is evaluated and data of the MRT system, which is defined as the explicit end of measuring, is regarded as the end of the measurement. This should be defined before the patient is moved out of the bore. Expiry of a predefined validity period between recognition of the local coil or the start of the measurement can also be ascertained. In an embodiment, at least one of said "end points" of a measurement is determined to thereby limit the life of the local coil. If an end of the measurement is established, an electrical measure, for example a high-power pulse, can be applied to render the local coil unusable or to change its corresponding property.

According to an embodiment of a method, purposefully changing a mechanical and/or an electrical property of the local coil (e.g. to cause the end of the life of the local coil) comprises a disablement of the local coil by a user, by an interface, or by the MRT system. Alternatively or in addition, purposefully changing a mechanical and/or an electrical property of the local coil comprises changing the local coil by way of an interface or the MRT system, e.g. its identification data, its impedance, its resistance, and/or its natural (e.g. resonant) frequency, to the extent that it is no longer recognized by the MRT system or is recognized as no longer being valid.

According to an embodiment of a method, purposefully changing a mechanical and/or an electrical property of the local coil comprises destruction of an electrical component of the local coil, e.g. destruction of the prime conductor, of a plug contact, a fusible cutout, or an electrical component part, e.g. of a resistor, of a diode, an inductor, or a capacitor. The local coil may be detuned with regard to its natural frequency by destruction of a fusible cutout or an electrical component part, with an electric circuit being activated or deactivated, for example, by way of this destruction. For example, a component part connected in parallel (e.g. an inductor or a capacitor) can be deactivated, and the local coil strongly detuned as a result, by opening a fusible cutout. Something similar is possible with diodes in which an internal short-circuit is generated by a high current or voltage pulse.

According to an embodiment of a method, purposefully changing a mechanical and/or an electrical property of the local coil may be caused by a mechanical severance of a component or at least its destruction by means of a force. Alternatively or in addition, purposefully changing a mechanical and/or an electrical property of the local coil may be caused by electrical destruction, e.g. blowing of a component by means of a grid-bound or induced current. This can, of course, be a current which has been induced by a high radio-frequency pulse or gradient pulse. This can e.g. occur by means of a preferred interface, which is configured for generating such a high-power pulse. For example, a prime conductor of the local coil or a fusible cutout is severed or short-circuited, or a number of contacts to the local coil is broken off. For example, the interface forms a mechanical intervention in the local coil, which when detached (by pulling or pushing a release button) of the interface results in the prime conductor being severed. For this, the prime conductor is configured to be self-supporting on a short section inside the local coil, so the conductor and its thin supporting structure can be easily broken in two.

According to an embodiment of a method, purposefully changing a property of the local coil comprises a change in a coil identification, e.g. an identification number, with a data interface of the local coil or its contact to the MRT system being mechanically or electrically destroyed, or the coil identification being changed in terms of its data technology. The coil identification can be, for example, a serial number or an individual count, which has been allocated to this local coil. In the case where the coil identification runs via an electrical interface, a conductor of this interface may be disconnected. Alternatively or in addition, the coil identification may be changed by mechanical disconnection or connection of a contact inside of the local coil, e.g. by switching a memory chip located in the local coil to a different address.

According to an embodiment of a method, purposefully changing an electrical property of the local coil and/or an item of information about the local coil in the MRT system comprises a change in terms of data technology in an item of information. An individual identification number of the local coil may be changed for example in a memory element of the local coil or of the MRT system. Alternatively or in addition, an item of information relating to the validity of an identification number of the local coil may also be changed. Alternatively or in addition, a key for data-technology communication between local coil and MRT system may also be changed. Alternatively or in addition, a count variable relating to the number of measurements still possible with this local coil may also be changed.

According to an embodiment of a method, the identification number of the local coil is compared with a database before the measurement by the MRT system, which database contains an item of information about the validity of the local coil. If the local coil is still valid, it remains valid and usable for a particular period or until a particular event occurs (see above: "end of the measurement"). It is then subsequently deleted from the list of usable local coils. The database can be used centrally for a plurality of scanners, or each scanner can have its own database, with these databases being regularly compared with each other, and this has the advantage the relevant scanner does not have to be online at the instant of the measurement.

For example, a code ID may be available as a further identification number on the part of the local coil in addition to the identification number. This code ID exists, for instance, in addition to serial numbers of a group of local coils, e.g. in the form of a bundle identification number for a plurality of local coils. The code ID may be e.g. compared with a database before the measurement by the MRT system, which database contains an item of information about the validity of the code ID. The available local coils can be allocated to the serial numbers by way of the code ID on the local coil (in the local coil by querying via the system) or a larger bundle of disposable coils. With the aid of this number, it is possible to authenticate oneself as the purchaser of the local coil or of the coil bundle and unlock use of the local coils on the local scanner or in a local hospital or purchase the unlocking. The bundle identification number can result in unlocking or downloading of the associated identification numbers of the local coils.

The identification number may e.g. represent a key, which is used for data communication with the MRT system. This can be achieved, for example, via a fixed algorithm in the system, which then generates or unlocks the associated serial numbers of the local coils. Comparison with a central server may take place here too, however, to prevent the use of the coils on other scanners by blocking the IDs. Each coil ID should only be available once, and it should be possible to use it only once.

According to one preferred method, communication takes place between the local coil and the MRT system by means of a challenge-response method. For instance, the local coil and the MRT system may comprise an identical password and a hash-generator. Thus, after receiving a count on the part of the MRT system, the local coil changes this count with the password, generates a hash value of the changed count, and returns (i.e. transmits) the hash value to the MRT system.

BRIEF DESCRIPTION OF THE DRAWINGS

The disclosure will be explained once again in more detail below with reference to the accompanying figures and on the basis of exemplary embodiments. Identical components are provided with identical reference numerals in the various figures. As a rule, the figures are not to scale. Only elements essential to the disclosure or helpful for understanding it are marked in the following figures.

In the drawings.

DETAILED DESCRIPTION OF THE DISCLOSURE

Figure 1:
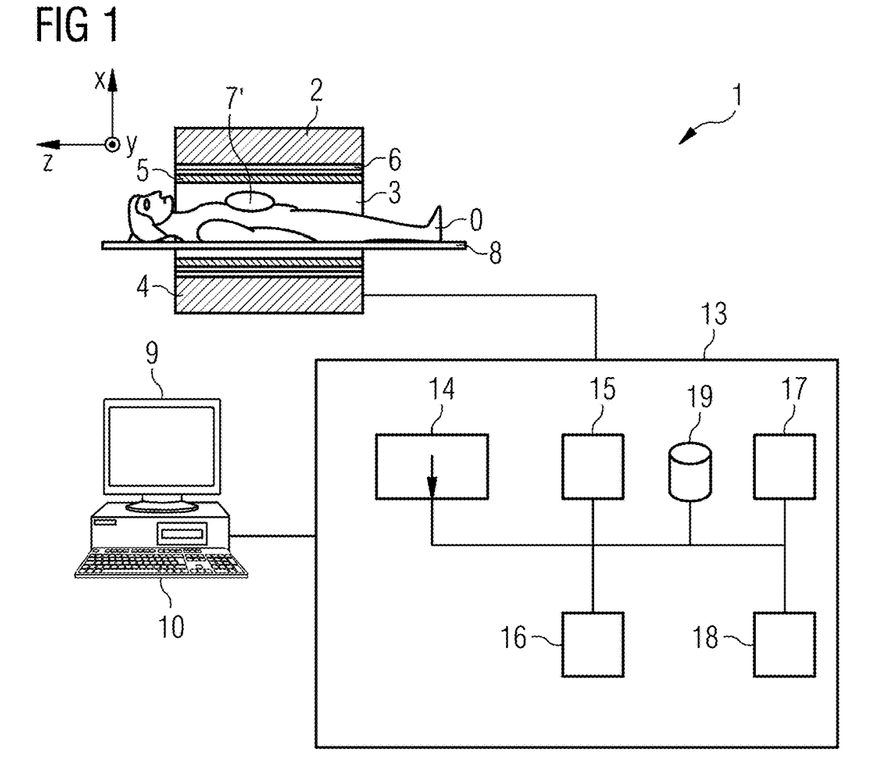
FIG. 1 illustrates a schematic representation of an example magnetic resonance tomography system, according to an embodiment of the disclosure.

FIG. 1 broadly schematically represents a magnetic resonance tomography system 1 (MRT system). The MRT system 1 comprises a magnetic resonance scanner 2 with an examination space 3 or patient tunnel, in which a patient or subject is positioned on a couch 8, in the body of which patient or subject the actual examination object O is located. Even if the examination object O in the torso is mapped in the represented example, diffusion tensor imaging is also often used for recordings of the brain since it is particularly well suited to mapping neurological structures.

The magnetic resonance scanner 2 is conventionally fitted with a basic field magnet system 4, a gradient system 6, an RF transmitting antenna system 5, and an RF receiving antenna system 7'. In the represented exemplary embodiment, the RF transmitting antenna system 5 comprises a body coil permanently installed in the magnetic resonance scanner 2, whereas the RF receiving antenna system 7' comprises local coils 7 which are to be arranged on the patient or subject (symbolized here by only a single local coil 7 on the body). The basic field magnet system 4 is conventionally embodied here such that it generates a basic magnetic field in the longitudinal direction of the patient, i.e. along the longitudinal axis of the magnetic resonance scanner 2 running in the in z-direction. The gradient system 6 conventionally comprises individually-actuatable gradient coils to be able to switch gradients independently of each other in the x-, y- or z-direction.

The MRT system 1 as shown in FIG. 1 comprises a whole-body system with a patient tunnel into which a patient can be fully introduced. This is provided by means of illustration and not limitation, as the embodiments of the disclosure can also be used on other MRT systems, for example with a laterally open, C-shaped housing. It is only essential that appropriate recordings of the examination object O can be made.

The magnetic resonance tomography system 1 also comprises a central control facility 13 (also referred to herein as a central control unit, central controller, or central control circuitry), which is used for controlling the MRT system 1. This central control facility 13 comprises a sequence control unit 14 (also referred to herein as a sequence controller or sequence control circuitry). The sequence control unit 14 controls the sequence of radio-frequency pulses (RF pulses) and gradient pulses as a function of a selected pulse sequence, or a sequence of a plurality of pulse sequences for recording a plurality of slices in a volume region of interest of the examination object within a measuring session. Such a pulse sequence can be predefined and parameterized, for example, within a measuring or control protocol. Various control protocols are customarily stored in a memory 19 for different measurements or measuring sessions, and can be selected by an operator (and optionally changed if required) and then used for carrying out the measurement. In the present case, the control facility 13 contains pulse sequences for the acquisition of the raw data.

For outputting the individual RF pulses of a pulse sequence, the central control facility 13 comprises a radio-frequency (RF) transmitting unit 15 (also referred to herein as an RF transmitting system, RF transmitting facility, RF transmitter, or RF transmitting circuitry), which generates the RF pulses, amplifies them, and feeds them into the RF transmitting antenna system 5 via a suitable interface (not represented in detail). For controlling the gradient coils of the gradient system 6 and to appropriately switch the gradient pulses according to the predefined pulse sequence, the control facility 13 comprises a gradient system interface 16. The sequence control unit 14 communicates appropriately with the radio-frequency transmitting facility 15 and the gradient system interface 16, for example by emitting sequence control data (SD) to execute the pulse sequence.

The control facility 13 also has a radio-frequency receiving unit (also referred to herein as an RF receiving system, an RF receiving facility, an RF receiver, or RF receiving circuitry) 17 (likewise communicating appropriately with the sequence control unit 14) to receive magnetic resonance signals inside the readout window predefined by the pulse sequence PS in a manner compared by means of the RF receiving antenna system 7', and thus acquire the raw data.

A reconstruction unit 18 adopts the acquired raw data here and reconstructs magnetic resonance image data from it. As a rule, this reconstruction also takes place on the basis of parameters, which can be predefined in the respective measuring or control protocol. This image data can then be stored, for example in the memory 19.

How, in detail, suitable raw data can be acquired by irradiation of RF pulses and switching gradient pulses and how MR images or parameter maps can be reconstructed from it is basically known, and will not be explained in detail here for purposes of brevity.

The central control facility 13 can be operated via a server 11 with an input unit 10 and a display unit 9, via which the entire magnetic resonance tomography system 1 can also thus be operated by an operator. Magnetic resonance tomography images can also be displayed on the display unit 9, and measurements can be planned and started by means of the input unit 10, optionally in combination with the display unit 9.

The magnetic resonance tomography system 1 and, in particular, the control facility 13, can also have a large number of additional or alternate components, which are not represented here in detail, but conventionally present on systems of this kind. For example, a network interface may be implemented to connect the entire system to a network and to be able to exchange raw data and/or image data or parameter maps, but also further data, such as patient-relevant data or control protocols.

How suitable raw data can be acquired by irradiation of RF pulses and generating gradient fields, and magnetic resonance tomography images can be reconstructed from it is known, and will not be explained in more detail here for purposes of brevity.

Figure 2:
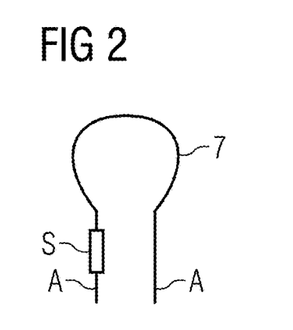
FIG. 2 illustrates an example local coil with fusible cutout, according to an embodiment of the disclosure.

FIG. 2 illustrates an example local coil 7 with a fusible cutout S. If this fusible cutout S is destroyed, for example by a high-power pulse, the two connecting pins A are no longer connected to each other and it is no longer possible for the local coil 7 to pick up a signal.

Figure 3:
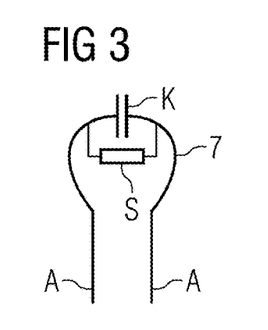
FIG. 3 illustrates an example local coil with fusible cutout and capacitor, according to an embodiment of the disclosure.

FIG. 3 illustrates an example local coil 7 with a fusible cutout S and a capacitor K. If this fusible cutout S is destroyed, it no longer bypasses the capacitor K and the resonant frequency of the local coil 7 changes due to the capacitor K.

Figure 4:
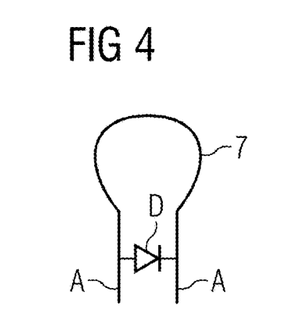
FIG. 4 illustrates an example local coil with diode (for short-circuiting), according to an embodiment of the disclosure.

FIG. 4 illustrates an example local coil 7 with a diode D. If this diode D is short-circuited by a high-power pulse, the two connecting pins A are directly connected to each other via the diode D and the local coil 7 can no longer pick up a signal.

Figure 5:
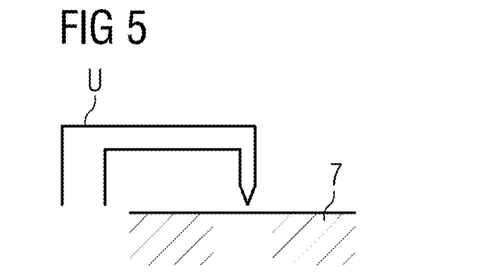
FIG. 5 illustrates an example conductor of a local coil with a mechanical interrupter, according to an embodiment of the disclosure.

FIG. 5 illustrates an example the conductor of an example local coil 7 with a mechanical interrupter U as the changing unit U. If this interrupter U is pressed against the conductor, the conductor is destroyed, and this results in destruction of the local coil 7.

Figure 6:
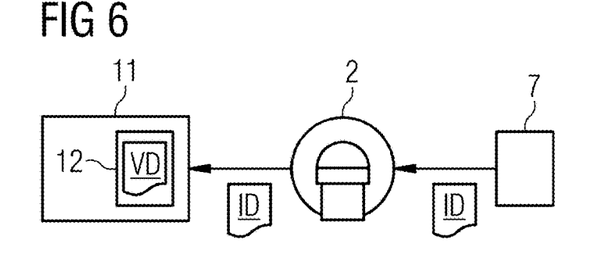
FIG. 6 illustrates an example communication method between a magnetic resonance scanner (or interface) and a server with a database, according to an embodiment of the disclosure.

FIG. 6 illustrates an example communication method between a magnetic resonance scanner 2 (or an interface) and a server 11 with a database 12. The local coil 7 sends identification data ID, for example its serial number, to the magnetic resonance scanner 2, which in turn forwards the identification data ID to the server 11. In the database 12, it is checked on the basis of comparison data VD whether the identification data ID pertains to a usable local coil 7. If the local coil 7 is usable, a measurement with the magnetic resonance scanner 2 is possible and the corresponding comparison data VD is subsequently changed in the database 12 such that a further measurement is no longer possible with the same local coil 7. For example, a list with serial numbers (as comparison data VD) is stored in the database 12. If the identification data ID sent by a local coil 7 accordingly matches one of these serial numbers, a measurement is possible; if not, then a measurement is not possible. After a measurement the relevant serial number can simply be deleted from the database 12.

Figure 7:
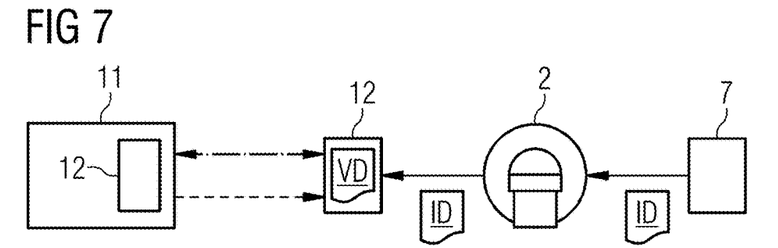
FIG. 7 illustrates an example communication method between a scanner (or interface) and a database (for example in the scanner), which can be optionally updated by a server, according to an embodiment of the disclosure.

FIG. 7 illustrates an example communication method between a magnetic resonance scanner 2 (or interface) and a database 12 (for example in the magnetic resonance scanner 2), which can be optionally updated by a server 11. The local coil 7 is checked as in FIG. 6, with the difference in this case being that the database 12 is located directly in the magnetic resonance scanner 2. Changed or deleted serial numbers can be communicated to other magnetic resonance scanners 2 by way of exchange with the database 12 in the server 11. The broken-line arrows indicate such communication between the databases 12. The database 12 in the server 11 can be updated by way of items of information from the databases 12 of the magnetic resonance scanners 2, or the scanners can be updated.

Figure 8:
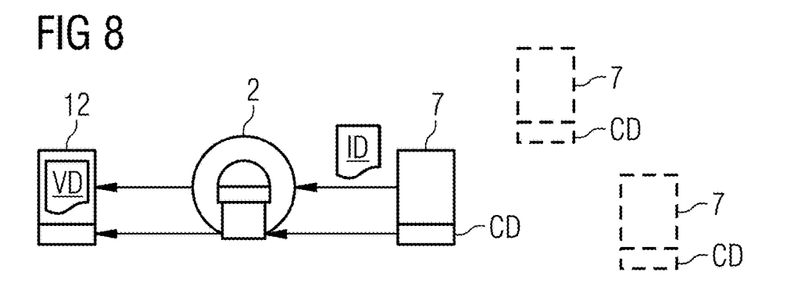
FIG. 8 illustrates an example communication method between a scanner (or interface) and a database with additional code ID (and an optional bundle), according to an embodiment of the disclosure.

FIG. 8 illustrates an example communication method between a magnetic resonance scanner 2 (or interface) and a database 12 with additional code ID CD (and an optional bundle). The local coil 7 is checked as in FIG. 6, with the difference in this case being that, additionally, a code ID CD is sent, which makes it possible to check unlocking of the bundle. If, for example, the code ID CD is unlocked, then a measurement with the local coils 7 of the bundle is possible, but only once with each.

Figure 9:
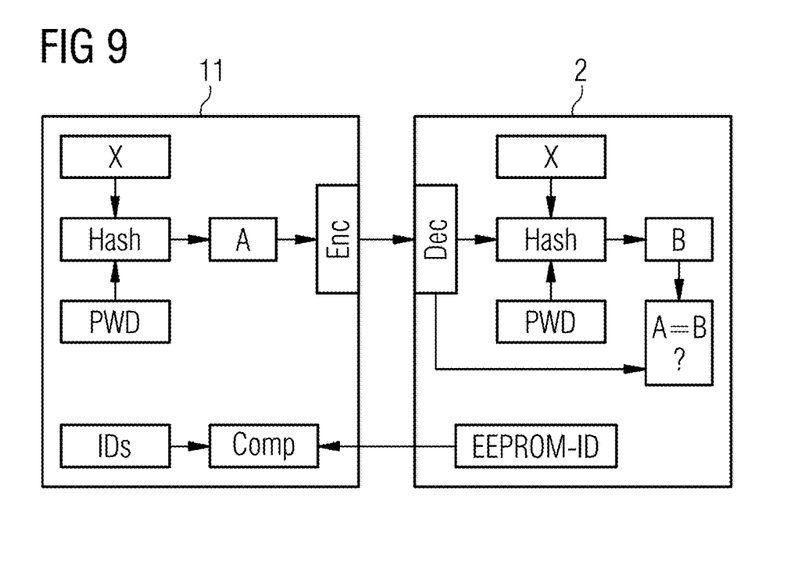
FIG. 9 illustrates an example challenge-response method, according to an embodiment of the disclosure.

FIG. 9 illustrates an example challenge-response method. A random count ("X"), which is known by the server 11 and magnetic resonance scanner 2, is changed by the influence of a password ("PWD"), and the hash value of the result is calculated. The hash value ("A") of the server 11 is sent to the magnetic resonance scanner 2 and compared there with the calculated hash value ("B"). If the two hash values ("A" and "B") match, the challenge-response method is positive (i.e. authenticated) and the comparisons (see FIGS. 6 to 8) can be carried out.

To conclude, reference is made once again to the fact that the methods previously described in detail and the represented local coil 7 are exemplary embodiments, which can be modified in a variety of ways by a person skilled in the art without departing from the scope of the disclosure. Furthermore, use of the indefinite article "a" or "an" does not preclude the relevant features from also being present multiple times. Similarly, the terms "unit" and "module" do not preclude the relevant components from comprising a plurality of cooperating sub-components, which can optionally also be spatially distributed. The expression "a number" should be understood as "at least one".

The various components described herein may be referred to as "units," "systems," or "facilities." Such components may be implemented via any suitable combination of hardware and/or software components as applicable and/or known to achieve their intended respective functionality. This may include mechanical and/or electrical components, processors, processing circuitry, or other suitable hardware components, in addition to or instead of those discussed herein. Such components may be configured to operate independently, or configured to execute instructions or computer programs that are stored on a suitable computer-readable medium. Regardless of the particular implementation, such units, systems, and/or facilities, as applicable and relevant, may alternatively be referred to herein as "circuitry," "controllers," "processors," or "processing circuitry," or alternatively as noted herein.

What is claimed is:

1. A method for invalidating a local coil for a magnetic resonance tomography (MRT) system, comprising:
performing, via the MRT system, a measurement with the local coil while the local coil is placed on a patient to be examined,
wherein the local coil is configured to facilitate the measurement for the MRT system by (i) receiving radio frequency (RF) signals comprising magnetic resonance (MR) signals emitted from the patient that are used for MR image reconstruction, and/or (ii) transmitting RF signals to excite tissue of the patient to cause the patient to emit MR signals; and
adjusting a parameter comprising a mechanical property of the local coil, an electrical property of the local coil, and/or an item of information about the local coil such that a number of possible measurements that may be performed via the MRT system with the local coil is reduced,
wherein the mechanical property of the local coil and/or the electrical property of the local coil is adjusted only after determining that the measurement with the local coil has been completed,
wherein after performing the measurement with the local coil via the MRT system, a further measurement is no longer possible with the local coil via the MRT system after adjusting the parameter,
wherein an indication for the completion of the measurement with the local coil comprises a determination of an end of the measurement by determining (1) whether a combination of predetermined sequences has been executed via the MRT system, (ii) whether the end of the measurement is defined by data of the MRT system, and/or (iii) whether the local coil has been unplugged from the MRT system or from an interface.

2. The method as claimed in claim 1, wherein the local coil is connected to the MRT system via an interface as an intermediate component, and
wherein the interface is configured to adjust the mechanical property of the local coil and/or the electrical property of the local coil.

3. The method as claimed in claim 1, wherein the indication for the completion of the measurement comprises an expiration of a predefined validity period between an identification of the local coil and a start of the measurement with the local coil.

4. The method as claimed in claim 1, wherein adjusting the mechanical property of the local coil and/or the electrical property of the local coil comprises disabling the local coil by a user, the interface, or the MRT system.

5. The method as claimed in claim 1, wherein adjusting the mechanical property of the local coil and/or the electrical property of the local coil comprises adjusting (i) identification data of the local coil, (ii) an impedance of the local coil, (iii) a resistance of the local coil, and/or (iv) a resonant frequency of the local coil such that the local coil is no longer recognized by the MRT system or is recognized as no longer being valid.

6. The method as claimed in claim 5, wherein the resonant frequency of the local coil is adjusted as a result of detuning by destroying a fusible cutout or an electrical component that results in an activation or a deactivation of an electric circuit of the local coil.

7. The method as claimed in claim 1, wherein adjusting the mechanical property of the local coil and/or the electrical property of the local coil comprises mechanically severing, via application of force and/or via electrical destruction, a component via a grid-bound or induced current.

8. The method as claimed in claim 7, wherein mechanically severing the component comprises blowing a conductor of the local coil, severing a fusible cutout of the local coil, short-circuiting a fusible cutout of the local coil, and/or breaking off one or more contacts of the local coil.

9. The method as claimed in claim 1, wherein adjusting the mechanical property of the local coil and/or the electrical property of the local coil comprises:
changing a coil identification associated with the local coil;
mechanically or electrically destroying a data interface of the local coil by disconnecting a conductor of the data interface of the local coil; and/or
switching a memory chip located in the local coil to a different address by mechanical disconnection or connection of a contact inside the local coil.

10. The method as claimed in claim 1, wherein adjusting the electrical property of the local coil and/or an item of information about the local coil comprises:
changing, in a memory element of the local coil or of the MRT system, (i) an identification number of the local coil, (ii) an item of information relating to a validity of an identification number of the local coil, (iii) a key used for communication between the local coil and the MRT system, and/or (iv) a count variable relating to a number of measurements that are still possible using the local coil.

11. The method as claimed in claim 1, wherein communications between the local coil and the MRT system utilize a challenge-response method.

12. The method as claimed in claim 1, further comprising:
after the measurement is performed via the MRT system, reconstructing MR image data using MR signals emitted from the patient.

13. A local coil used to perform a measurement with a magnetic resonance tomography (MRT) system in which the local coil is selectively invalidated by the MRT system, the local coil comprising:
a set of connecting pins;
a protected memory,
wherein content of the protected memory is configured to be changed via an element of the local coil or via an interface but not by a user; and
processing circuitry configured to adjust a parameter comprising a mechanical property of the local coil, an electrical property of the local coil, and/or an item of information about the local coil such that a number of possible measurements that may be performed via the MRT system with the local coil is reduced,
wherein after performing the measurement with the local coil via the MRT system, a further measurement is no longer possible with the local coil via the MRT system after adjusting the parameter, and
wherein the local coil is configured to facilitate the measurement for the MRT system while the local coil is placed on a patient to be examined by (i) receiving radio frequency (RF) signals comprising magnetic resonance (MR) signals emitted from the patient that are used for MR image reconstruction, and/or (ii) transmitting RF signals to excite tissue of the patient to cause the patient to emit MR signals.

14. A magnetic resonance tomography (MRT) system for performing a measurement using a local coil that is selectively invalidated by the MRT system, the MRT system comprising:
a basic field magnet system; and
processing circuitry configured to adjust a parameter comprising a mechanical property of the local coil, an electrical property of the local coil, and/or an item of information about the local coil such that a number of possible measurements that may be performed via the MRT system with the local coil is reduced,
wherein adjusting the mechanical property of the local coil and/or the electrical property of the local coil comprises destroying an electrical component of the local coil comprising (1) a prime conductor, (ii) a plug contact, (iii) a fusible cutout. (iv) a resistor. (v) a diode, (vi) an inductor, and/or (vii) a capacitor,
wherein after performing the measurement with the local coil via the MRT system, a further measurement is no longer possible with the local coil via the MRT system after adjusting the parameter, and
wherein the local coil is configured to facilitate the measurement for the MRT system while the local coil is placed on a patient to be examined by (i) receiving radio frequency (RF) signals comprising magnetic resonance (MR) signals emitted from the patient that are used for MR image reconstruction, and/or (ii) transmitting RF signals to excite tissue of the patient to cause the patient to emit MR signals.

15. A method for invalidating a local coil for a magnetic resonance tomography (MRT) system, comprising:
performing, via the MRT system, a measurement with the local coil while the local coil is placed on a patient to be examined,
wherein the local coil is configured to facilitate the measurement for the MRT system by (i) receiving radio frequency (RF) signals comprising magnetic resonance (MR) signals emitted from the patient that are used for MR image reconstruction, and/or (ii) transmitting RF signals to excite tissue of the patient to cause the patient to emit MR signals; and
adjusting a parameter comprising a mechanical property of the local coil, an electrical property of the local coil, and/or an item of information about the local coil such that a number of possible measurements that may be performed via the MRT system with the local coil is reduced,
wherein adjusting the mechanical property of the local coil and/or the electrical property of the local coil comprises destroying an electrical component of the local coil comprising (i) a prime conductor, (ii) a plug contact, (iii) a fusible cutout, (iv) a resistor, (v) a diode, (vi) an inductor, and/or (vii) a capacitor, and
wherein after performing the measurement with the local coil via the MRT system, a further measurement is no longer possible with the local coil via the MRT system after adjusting the parameter.

16. A method for invalidating a local coil for a magnetic resonance tomography (MRT) system, comprising:
performing, via the MRT system, a measurement with the local coil while the local coil is placed on a patient to be examined, wherein the local coil is configured to facilitate the measurement for the MRT system by (i) receiving radio frequency (RF) signals comprising magnetic resonance (MR) signals emitted from the patient that are used for MR image reconstruction, and/or (ii) transmitting RF signals to excite tissue of the patient to cause the patient to emit MR signals;

adjusting a parameter comprising a mechanical property of the local coil, an electrical property of the local coil, and/or an item of information about the local coil such that a number of possible measurements that may be performed via the MRT system with the local coil is reduced;

comparing an identification number of the local coil with a database prior to performing the measurement by the MRT system; and comparing a code identifier with entries in the database prior to the measurement by the MRT system, wherein after performing the measurement with the local coil via the MRT system, a further measurement is no longer possible with the local coil via the MRT system after adjusting the parameter.

17. The method as claimed in claim 16, wherein:

the code identifier is a further identification number of the local coil and is associated with a respective one of a plurality of identification numbers for a plurality of local coils, the database contains an item of information about a validity of the local coil and an item of information about a validity of the code identifier, and the identification number represents a key that is used for data communications with the MRT system.

18. A local coil used to perform a measurement with a magnetic resonance tomography (MRT) system in which the local coil is selectively invalidated by the MRT system, the local coil comprising:

a set of connecting pins;

processing circuitry configured to adjust a parameter comprising a mechanical property of the local coil, an electrical property of the local coil, and/or an item of information about the local coil such that a number of possible measurements that may be performed via the MRT system with the local coil is reduced, wherein after performing the measurement with the local coil via the MRT system, a further measurement is no longer possible with the local coil via the MRT system after adjusting the parameter, wherein the local coil is configured to facilitate the measurement for the MRT system while the local coil is placed on a patient to be examined by (i) receiving radio frequency (RF) signals comprising magnetic resonance (MR) signals emitted from the patient that are used for MR image reconstruction, and/or (ii) transmitting RF signals to excite tissue of the patient to cause the patient to emit MR signals, and ascertaining circuitry configured to determine a completion of the measurement with the local coil via the MRT system, wherein the local coil is configured such that, after determining the completion of the measurement with the local coil, adjusting the parameter of the local coil is performed automatically.

* * * * *